Patented Jan. 31, 1933

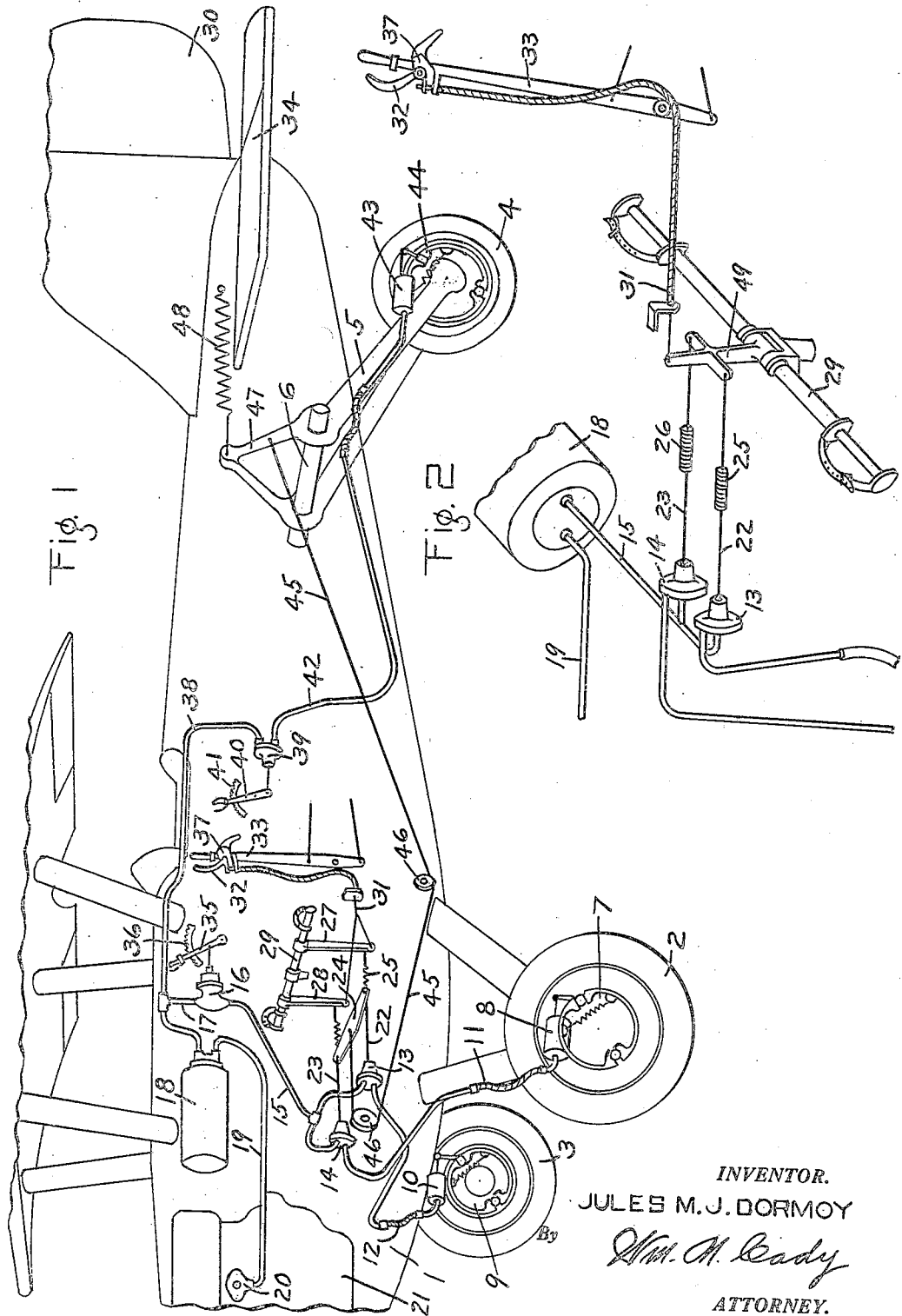

1,895,452

UNITED STATES PATENT OFFICE

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA

BRAKE FOR AIRCRAFT

Application filed September 17, 1931, Serial No. 563,288, and in France November 10, 1930.

This invention relates to fluid pressure braking apparatus for aircraft of the kind in which separate braking mechanisms are provided for the landing wheels on the right and left hand sides of the aircraft chassis, one or other of these braking mechanisms being rendered operative to greater or less extent, in order to control or to assist in controlling the direction of movement of the aircraft when traveling on the ground.

According to the principal feature of the invention, the differential operation of the braking mechanisms in this manner, which is arranged to be controlled by the control member for the directional rudder or tail of the aircraft determining its horizontal course during flight, is arranged to be modified by the action of certain other brake controlling mechanism so that the degree of braking effected is subject to the action of this additional controlling mechanism which is independently adjustable by the pilot in accordance, for instance, with the nature of the surface of the ground or other conditions determining the degree of braking which should be effected.

According to a further feature of the invention, the braking mechanism is arranged to be rendered wholly or partly inoperative independently of the pilot so long as the rear portion or tail of the aircraft is not being supported on the surface of the ground, thus preventing any risk of the aircraft capsizing in the forward direction when alighting.

The invention is illustrated by way of example in the accompanying drawing of which Fig. 1 is a somewhat diagrammatic perspective view of an aeroplane provided with braking mechanism arranged and adapted to be controlled in accordance with one form of the invention. Figure 2 is a view of a portion of the controlling mechanism shown in Fig. 1, but illustrating a modified construction.

Referring now to the drawing, it will be seen that the chassis 1 of the aeroplane is provided with a pair of front landing wheels 2, 3 mounted on the chassis 1 in any suitable manner, the rear portion of the chassis being provided with a rear wheel 4 mounted upon a supporting member 5 pivotally mounted as indicated at 6 on the chassis 1. The left hand landing wheel 2 is provided with braking mechanism 7 comprising a brake cylinder 8, the right hand landing wheel 3 being similarly provided with braking mechanism 9 comprising a brake cylinder 10. The brake cylinders 8, 10 communicate by means of flexible pipe couplings 11, 12 respectively with control valves 13, 14 to which fluid under pressure is supplied by means of a pipe 15 leading to a control valve 16. The latter communicates by means of a pipe 17 with a reservoir 18 communicating by means of a pipe 19 with the induction pipe 20 of the aeroplane engine 21.

The control valves 13, 14 may be of any suitable type, but preferably comprise a movable valve operating member, the pull exerted upon which automatically determines the degree of braking pressure established in the brake cylinders 10, 8 controlled by the valves 13, 14 respectively.

The movable members of the controlling valves 13, 14 are connected by means of rods or wires 22, 23, respectively to the ends of a horizontal rocking bar 24, the ends of this bar being also connected through tension springs 25, 26, respectively to the lower ends of a pair of vertical arms 27, 28, the upper ends of which are pivotally mounted upon the rudder control bar 29. The control bar 29 is connected by any usual or suitable mechanism (not shown), to the right and left directing rudder 30 of the aeroplane and is arranged to be rotated in a horizontal plane by the pilot in one direction or other so as to produce a corresponding deflection of the rudder 30.

The lower ends of the arms 27, 28, are connected by means of a Bowden wire transmission 31 to a control handle 32 mounted in any suitable position in the aeroplane and preferably as shown in Fig. 1, mounted upon the end of the control lever 33 operating the up and down directing rudder 34 of the aeroplane.

The control valve 16 is adapted to be operated by means of a handle 35 provided with a notched quadrant 36 so that by operating the handle 35, the fluid pressure obtaining within the pipe 15 can be adjusted to any desired value. The handle 32 is provided with a catch device 37 by means of which, after the handle has been set into its extreme position it can be held retained in this position if desired.

The vacuum reservoir 18 communicates by means of a pipe 38 with a control valve 39 operated by means of a handle 40 and a notched quadrant 41, a pipe 42 leading from the control valve 39 to a brake cylinder 43 forming a portion of the braking mechanism 44 on the rear wheel 4.

The central point of the rocking bar 24 is connected by means of a flexible wire 45 passing around pulleys 46 to a point in an upward extension 47 of the supporting member 5, the upper end of the extension 47 being connected by means of a strong spring 48 to the chassis 1 of the aeroplane.

The operation of the apparatus shown in Fig. 1 is as follows:

The vacuum reservoir 18 being connected by means of the pipe 19 to the induction pipe 20 of the engine 21, a suitable degree of vacuum will be maintained in the reservoir 18 owing to the operation of the engine 21, the vacuum in this reservoir serving as the source of power for the braking mechanism. The control valve 16 can be adjusted by the pilot by means of the handle 35 to any desired position so as to determine the maximum degree of vacuum which can be obtained in the brake cylinders 8, 10, of the braking mechanism 7, 9 of the front landing wheels 2, 3 respectively, the handle 35 being adjusted by the pilot to any desired setting in accordance with the nature of the ground or other factors determining the extent of braking which should be properly employed.

The vacuum as thus determined by the setting of the control valve 16 is transmitted by way of the pipe 15 to the control valves 13, 14. In the normal or central position of the rudder control bar 29 the valves 13, 14 are both closed with the result that atmospheric pressure exists in the brake cylinders 8, 10.

The pilot operates the rudder control bar 29 in the usual manner to effect the deflection to any desired extent in one direction or the other of the right and left directing rudder 30 of the aeroplane and this movement of the rudder bar 29 will evidently be accompanied by a corresponding movement of the arms 27, 28. As a result, tension will be applied to one or other of the springs 25, 26, and will cause a corresponding deflection of the rocking bar 24 which will accordingly exert a corresponding pull upon the valves 13, 14 through the connecting wires 22 or 23.

One or other of the valves 13, 14 will thus be opened and vacuum will be supplied through the flexible connections 12 or 11 to the brake cylinder 10 or 8 on the landing wheels 3 or 2. It will thus be appreciated that when the rudder bar 29 is rocked from its normal or central position so as to cause the right and left directing rudder 30 to move to the right thus producing a right hand turning movement of the aeroplane, the valve 13 will be opened and will cause the braking mechanism 9 on the right hand landing wheel 3 to be rendered operative, while an opposite movement of the rudder bar 29 will similarly cause the braking mechanism 7 on the left hand wheel to be operative.

This differential operation of the braking mechanisms 7 and 9 will evidently cause a turning movement of the aeroplane when traveling along the ground corresponding to the turning movement due to the right and left directing rudder 30 when the aeroplane is in flight, so that the pilot by displacing the rudder bar 29 in one direction or the other will be able to produce the same turning movement whether the aeroplane is in the air or on the ground.

The differential action of the control valves 13, 14 above described may however be modified by the action of the handle 32 which when adjusted by the pilot will, through the Bowden wire transmission 31, maintain the valves 13, 14 in their open positions regardless of the position of the rudder bar 29, the Bowden wire transmission under these conditions causing the arms 27, 28 to be moved towards the rear carrying with them the rocking bar 24 and thereby maintaining the valves 13, 14 open. The handle 32 which can be maintained in its operative position above described by means of the retaining device 37, thus enables the pilot to maintain the braking mechanism 7, 9 on the front landing wheels fully applied even when the engine 21 of the aeroplane is being operated so that prior to commencing a flight the engine 21 can be started into operation without the aeroplane being carried along on the ground surface.

The action of the control valves 13, 14 can also be modified as shown in Fig. 1 in accordance with the position of the supporting member 5 by means of the flexible wire or cable 45 connected to the rocking bar 24. As shown in the drawing, the supporting member 5 is, while the aeroplane is in flight, maintained in the position shown, by the action of the spring 48 so that the tension exerted upon the flexible wire 45 will maintain the rocking bar 24 in its normal position shown in Fig. 1, in which both the valves 13 and 14 are closed. Under these conditions while the aeroplane is in flight, the operation of the rudder control bar 29 by the pilot for the purpose of controlling the position of the right and left directing rudder 30 will not effect the opening of the valve 13 or 14 since the displacement of the rudder bar 29 and of the arms 27, 28 carried thereby will only cause the springs 25 or 26 to be extended without causing corresponding rearward movement of the rocking bar 24, since this bar is held in the position shown by the action of the more powerful spring 48.

With this arrangement it will be seen that during flight the braking mechanisms 7, 9 are inoperative. When however the aeroplane lands, the supporting member 5 is displaced by the weight of the rear portion of the aeroplane against the action of the spring 48 and the tension in the flexible wire 45 being thereby released or reduced, the rocking bar 24 will be free to operate to open the valve 13 or the valve 14 as above described when the rudder bar 29 is moved in one direction or the other by the pilot, thereby effecting the desired differential braking action.

This additional control in accordance with the position of the supporting member 5 may however be omitted if desired.

The connection between the vacuum reservoir 18 and the brake cylinder 43 of the braking mechanism 44 on the rear landing wheel 4 of the aeroplane is controlled by means of a valve 39, the operating handle 40 of which, by its adjustment, evidently enables the braking action exerted upon the rear wheel 4 to be varied as desired.

In a modified arrangement the pipe 38 instead of being directly connected to the reservoir 18 may be connected to the pipe 15, thus enabling the control of the braking mechanism 44 to be also effected by the setting of the handle 35 of the control valve 16.

The braking mechanism on the rear wheel 4 of the aircraft and the controlling valve 39 may in certain cases be dispensed with.

Referring now to the arrangement shown in Fig. 2, the control of the braking mechanism in accordance with the position of the supporting member 5 of the aeroplane is in this case omitted, the rudder bar 29 being provided with a cross head 49 pivotally mounted upon the rudder bar 29, the arms of the cross head being connected to the springs 25, 26 of the movable elements of the valves 13, 14.

It will be evident that the invention provides arrangements whereby the braking mechanisms provided on an aircraft can be effectively controlled by the pilot under all conditions of operation with or without an additional automatic control dependent upon whether the aircraft is in flight or is travelling on the surface of the ground and the invention is not limited to the particular constructional arrangement above described and illustrated by way of example which may be modified in various respects without exceeding the scope of the invention.

Having now described my invention, what I claim as new and desire to secure by Letters Patent, is:

1. In an airplane, the combination with landing wheels and a control member for the directional rudder of the airplane, of fluid pressure operated braking mechanisms for the airplane landing wheels, a valve device for each braking mechanism for controlling the supply of fluid pressure to the corresponding brake mechanism, means controlled by said control member for operating either of said valve devices, and separate manually controlled means for also operating said valve devices.

2. In an airplane, the combination with landing wheels and a control member for the directional rudder of the airplane, of fluid pressure operated braking mechanisms for the airplane landing wheels, a valve device for each braking mechanism for controlling the supply of fluid pressure to the corresponding brake mechanism, means controlled by said control member for operating either of said valve devices, and manually controlled means for simultaneously operating said valve devices in one position of said control member.

3. In an airplane, the combination with landing wheels and a control member for the directional rudder of the airplane, of fluid pressure operated braking mechanisms for the airplane landing wheels, a valve device for each braking mechanism for controlling the supply of fluid pressure to the corresponding brake mechanism, means controlled by said control member for operating either of said valve devices, and manually controlled means for also operating said valve devices independently of the operation of said control member.

4. In an airplane, the combination with front landing wheels, a rear landing wheel, and a control member for the directional rudder of the airplane, of braking fluid pressure operated mechanisms for each of the front landing wheels, a valve device for each braking mechanism for controlling the supply of fluid pressure to the corresponding brake mechanism, means controlled by said control member for operating said valve devices, and means operative upon engagement of the rear landing wheel with the ground for rendering said valve devices operative by operation of said control member.

5. In an airplane, the combination with front landing wheels, a rear support member, and a steering control member, of a braking mechanism including a control valve operatively connected to said control member, a spring interposed in the operating connection between the control valve and the control member, means opposing operation of said valve by said control member including an operating connection between the rear support member and the valve and a spring associated with said rear support member, said spring being rendered inoperative to oppose operation of said valve by said control member upon engagement of the rear support member with the ground.

In testimony whereof, I have hereunto set my hand this 3 day of September, 1931.

JULES MARIE JOSEPH DORMOY.